US008971646B1

(12) United States Patent
Wu

(10) Patent No.: US 8,971,646 B1
(45) Date of Patent: *Mar. 3, 2015

(54) FACE AND LICENSE PLATE DETECTION IN STREET LEVEL IMAGES WITH 3-D ROAD WIDTH FEATURES ESTIMATED FROM LASER DATA

(71) Applicant: Google Inc., Mountain View, CA (US)

(72) Inventor: Bo Wu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/297,949

(22) Filed: Jun. 6, 2014

Related U.S. Application Data

(63) Continuation of application No. 13/359,235, filed on Jan. 26, 2012, now Pat. No. 8,761,498.

(51) Int. Cl.
| G06K 9/46 | (2006.01) |
| G06K 9/62 | (2006.01) |
| G06K 9/00 | (2006.01) |
| G06K 9/48 | (2006.01) |
| G06K 9/32 | (2006.01) |

(52) U.S. Cl.
CPC ............ G06K 9/00664 (2013.01); G06K 9/481 (2013.01); G06K 9/3258 (2013.01)
USPC .......................................... 382/224; 382/190

(58) Field of Classification Search
None
See application file for complete search history.

(56) References Cited

U.S. PATENT DOCUMENTS

| 7,630,806 | B2 | 12/2009 | Breed |
| 7,817,848 | B2 | 10/2010 | Sakata et al. |
| 8,184,159 | B2 | 5/2012 | Luo |
| 2004/0260433 | A1 | 12/2004 | Sawada et al. |
| 2009/0262987 | A1 | 10/2009 | Ioffe et al. |
| 2012/0035846 | A1 | 2/2012 | Sakamoto et al. |
| 2012/0133497 | A1 | 5/2012 | Sasaki |

OTHER PUBLICATIONS

Hoiem et al., ":Putting Objects in Perspective," Proceedings of the IEEE Conference on Computer Vision and Pattern Recogmt10n (CVPR), vol. 2, pp. 2137-2144, (2006).
Frome et al., "Large-Scale Privacy Protection in Google Street View", Proceedings of the IEEE 12th International Conference on Computer Vision—ICCV, vol. 50, pp. 2373-2380, (2009).

(Continued)

*Primary Examiner* — Anand Bhatnagar
*Assistant Examiner* — Soo Park
(74) *Attorney, Agent, or Firm* — Lerner, David, Littenberg, Krumholz & Mentlik, LLP

(57) ABSTRACT

A computer implemented system for identifying license plates and faces in street-level images is disclosed. The system includes an object detector configured to determine a set of candidate objects in the image, a feature vector module configured to generate a set of feature vectors using the object detector to generate a feature vector for each candidate object in the set of candidate objects, a composite feature vector module to generate a set of composite feature vectors by combining each generated feature vector with a corresponding road or street description of the object in question, and an identifier module configured to identify objects of a particular type using a classifier that takes a set of composite feature vectors as input and returns a list of candidate objects that are classified as being of the particular type as output.

20 Claims, 6 Drawing Sheets

(56) References Cited

OTHER PUBLICATIONS

Vijayanarasimhan et al., "Efficient Region Search for Object Detection," Proceedings of the IEEE Conference on Computer Vision and Pattern Recognition (CVPR), vol. 1, pp. 1401-1408, (2011).

Wikipedia, "Supervised learning," (http://en.wikipedia.org/wiki/Supervised_learning), updated May 25, 2012, 7 pages.

Wikipedia, "Support vector machine," (http://en.wikipedia.org/wiki/Support_vector_machine), updated Jun. 13, 2012, 13 pages.

Wikipedia, "Machine learning," (http://en.wikipedia.org/wiki/Machine_learning), updated Jun. 18, 2012, 8 pages.

FACE AND LICENSE PLATE DETECTION IN STREET LEVEL IMAGES WITH 3-D ROAD WIDTH FEATURES ESTIMATED FROM LASER DATA

CROSS-REFERENCE TO RELATED APPLICATIONS

The present application is a continuation of U.S. patent application Ser. No. 13/359,235, filed Jan. 26, 2012, the entire disclosure of which is incorporated herein by reference.

BACKGROUND

1. Field

This disclosure generally relates to image processing and object recognition.

2. Background Art

Recent advances in computer networking and image processing have led to widespread availability of street-level imagery on the World Wide Web (i.e., "the web"). Much of this imagery is systematically gathered through large-scale efforts. The process of gathering images of public spaces, however, often leads to the capture of license plates, faces, and other information considered sensitive from a privacy standpoint.

Some large-scale image gathering efforts employ strategies to intentionally obscure sensitive information appearing in captured images. Such an approach, however, presents a formidable challenge. For one reason, large-scale image gathering efforts produce an enormous amount of imagery that must be processed using fully automatic optimized algorithms running on large computing platforms.

In order to ensure privacy, objects such as faces and license plates must be automatically detected and obscured in the published image. Reliable object detection is difficult, however, due to the fact that there is little control over the conditions of image capture, and thus, the appearance of objects can vary widely. People in captured images may appear close to the camera or in the background, in shadows or partially obscured by other objects. Image detection algorithms may exhibit false positives or alternatively, fail to detect faces that are clearly recognizable to an observer.

The detection of license plates is also challenging. Variations in viewing angle, the presence of shadows or obstructions, as well as variations in the appearance of license plates across geographic areas, pose difficulties even for state-of-the-art object detection algorithms.

The recall percentage of an object detection algorithm describes the algorithm's ability to detect a certain type of object. Algorithms that are tuned for high recall also necessarily produce false positives. From a privacy perspective, however, false positives are preferable to situations in which recognizable faces are not found by the algorithm. An ideal algorithm would exhibit 100% recall with no false positives. This, however, is beyond the reach of state-of-art automatic methods.

Lastly, it is important to preserve the quality of images while achieving high recall. This requires one to control the false positive rate and to obscure faces and license plates in a manner unobtrusive enough so that a viewer's eyes are not drawn to erroneously obscured regions.

BRIEF SUMMARY

This disclosure relates to systems and methods for automatically detecting objects such as faces and license plates in an image. In an embodiment method, a machine learning algorithm is used to generate a classifier for detecting objects in a digital image. The method is based on using a training data set of objects in one or more digital images, wherein the objects appear near or in a street or roadway, and wherein the set of objects include some objects that are labeled as being of a particular type, such as faces or license plates, along with objects that are labeled as not being of the particular type. An object detector, such as a face or license plate detector, using a primary high-recall sliding window detector and a secondary high-precision low sensitivity detector, is used to generate a feature vector for each object in the set of objects, wherein each feature vector includes a detector score. A set of composite feature vectors is then generated from the set of feature vectors by combining each feature vector with a corresponding road or street description including a road or street width estimate. A machine learning algorithm, such as a Support Vector Machine (SVM), is then used to generate an object classifier. The machine learning algorithm takes the set of composite feature vectors as input and returns the object classifier as output.

The object classifier, so generated, is then used in a further embodiment method for identifying objects in an arbitrary digital image, wherein the objects appear near or in a street or roadway. In this embodiment an object detector, such as a detector for faces or license plates, is used to determine a set of candidate objects in an image. In the next stage, a set of feature vectors is generated for each candidate object, contained in a set of candidate objects, wherein each feature vector includes a detection score. From the generated feature vectors, a set of composite feature vectors is then generated by combining each feature vector with a corresponding road or street description including a road or street width estimate. The object classifier is then used to identify objects of a particular type. The object classifier takes the set of composite feature vectors as input and returns a list of candidate objects that are classified as being of the particular type, such as faces or license plates.

Further features and advantages as well as the structure and operation of various embodiments are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and together with the description further serve to explain the principles of the invention and to enable a person skilled in the pertinent art(s) to make and use the invention.

Figure 1:
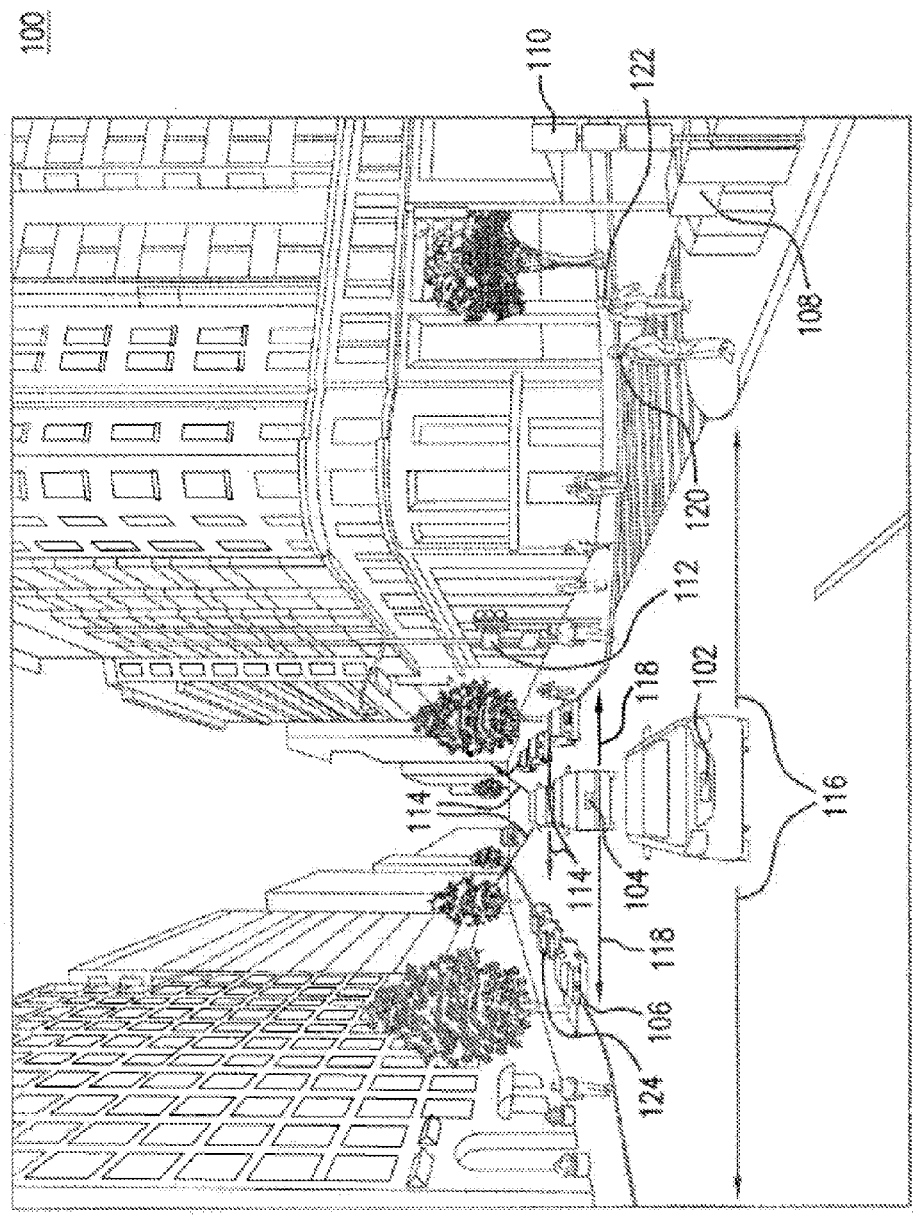
FIG. 1 illustrates a typical street-level image with objects considered sensitive from a privacy standpoint including faces and license plates.

Embodiments are described below with reference to the accompanying drawings. In the drawings, like reference numbers generally refer to identical or functionally similar elements. Additionally, the leftmost digit(s) of a reference number generally identifies the drawing in which the reference number first appears.

DETAILED DESCRIPTION

This disclosure is directed to systems and methods for using machine learning algorithms to accurately detect faces and license plates in digital images. One aspect of the disclosed embodiments is the use of cues, such as three-dimensional (3-D) road widths estimated from laser data, to improve the accuracy of automatic face and license plate detection systems for street level images.

It is noted that reference in this specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic, is described in connection with an embodiment, it is submitted that it is within the knowledge of one skilled in the art to effect such feature, structure, or characteristic, in connection with other embodiments whether or not explicitly described. The following detailed description refers to the accompanying drawings that illustrate the exemplary embodiments consistent with this invention. The detailed description is not meant to limit the invention, but rather, the scope of the invention is defined by the appended claims.

The disclosed embodiments relate to automatic privacy protection as it relates to detection of faces and license plates in street-level digital images. Systems and methods apply a two-stage process. In the first stage, an object is detected, wherein the object may be a face or license plate. Objects are detected using generic face or license plate classifiers. These classifiers, applied to images, find most faces and license plates with some false positives.

The second stage is a post-processing stage wherein application-specific cues are used to filter out false positives from the first stage. Examples of application-specific cues include the height or size of a face or license plate. Other cues can provide context such as whether or not a car can be identified in the environment around a license plate.

One aspect of the disclosed embodiments is the use of road width data to improve feature detection. The objects of interest appear in street-level images and therefore can most likely be found within or nearby the bounds of a street or roadway. Road width data can often be obtained during the image capture process. In certain systems, street-level images are gathered by a moving vehicle using a cluster of cameras. Some of these systems may also be equipped with laser sources and sensors to detect distances from the cameras to objects appearing in the images. From the laser data it is possible to estimate 3-D road widths (i.e., to obtain a collection of estimated distances from the laser sources to road or street edges). The road width data gathered by laser sensors can be used as information to be added to the feature vector for the post-processing classifier. Including such information leads to improved detection results.

FIG. 1 illustrates a typical street-level digital image containing features that may be considered sensitive from a privacy standpoint. For example, FIG. 1 includes license plates 102, 104, and 106 as well as human faces 120 and 122. The image also contains a number of features, such as 108, 110, and 112 that are similar to license plates but are not of interest. One aspect of the disclosed feature detection embodiments is the ability to distinguish between features of interest, such as license plates 102, 104, and 106 and features that are similar but are not of interest such as street signs 108, 110, and 112.

As mentioned above, application-specific cues are useful in the post-processing stage for eliminating false positives. Examples of application-specific cues include the height or size of a face or license plate. Other cues can provide context such as whether or not a car can be identified in the environment around a license plate.

The disclosed embodiments make use of 3D road width data to provide application-specific cues. The effective road width associated with an object in an image varies with position in the image. For example, in FIG. 1 the car having license plate 102 has a first effective road width 116 while the car with license plate 104 has a second effective road width 118. As can be seen from FIG. 1, the effective road width varies due to the presence of objects along the road such as parked cars 124. A car traveling along a street with parked cars 124 has a smaller effective road width 118 while a car traveling near an intersection has a larger effective road width 116.

The disclosed embodiments use machine learning algorithms that allow computers to develop "learned" behavior based on empirical data. Effectively, the computer "learns" to recognize patterns in images based on data provided in a set of training images. A key concept in machine learning is the notion of a "feature vector" that characterizes a detected object. In the first stage of a two-stage process, a collection of rectangular objects may be detected containing both objects of interests such as license plates such as 102, 104, and 106 as well as objects that are not of interest such as street signs 108, 110, and 112.

In the second stage, an object classifier is used to filter out false positives. The classifier is "trained" using a collection of images containing both the images of interest (e.g., license plates 102, 104, and 106) as well as images that are not of interest (e.g., street signs 108, 110, and 112). The object classifier is a mathematical model that is constructed based on the training data including information designating which objects are of interest and which ones are not of interest. Once the object classifier has been constructed based on the training data, it can be used to classify new, previously unseen objects.

The feature vector is a mathematical object that combines the attributes of a detected object (size, shape, location, etc.). The feature vector is a vector in the mathematical sense having a specific set of components. The values of the components denote the values of the specific quantities that describe the object (e.g., size, shape, location, etc.). Further information in the feature vector can include a ratio of the height to edge width of the box containing the object that is detected. The ratio of the box height to box edge width may capture whether the real world 3D size of the object indicated in a region is reasonable, given the examples contained in the training set. Embodiments of the present invention also include information regarding the surroundings of the object in question, for example, a description of a road or street widths (e.g., 116 and 118) that includes objects of interest.

Through the process of machine learning, the object classifier is generated by in a way that captures trends in the data. For example, the placement of objects of interest is correlated with where they appear in the image. License plates (e.g., 102, 104, and 106) generally appear within the region associated with a road or street (e.g., associated with widths 116 and 118), while human faces (e.g., 120 and 122) tend to appear outside of the region (e.g., on the sidewalk). By using a sufficient amount of training data, such correlations are built into the object classifier.

The road width data used to generate object classifiers in the disclosed embodiments is effectively three dimensional. Thus, in contrast to the simplified road widths 116 and 118 shown in FIG. 1, road width data is actually given in terms of a collection of distance vectors as shown in 114 of FIG. 1. Such data can be gathered using laser sensors (e.g., LIDAR sensors) mounted on a vehicle. The vehicle can also be equipped with a collection of cameras that point in various directions. The vehicle can be driven through a neighborhood to gather imagery along with GPS position information and three-dimensional road-width data.

Figure 2:
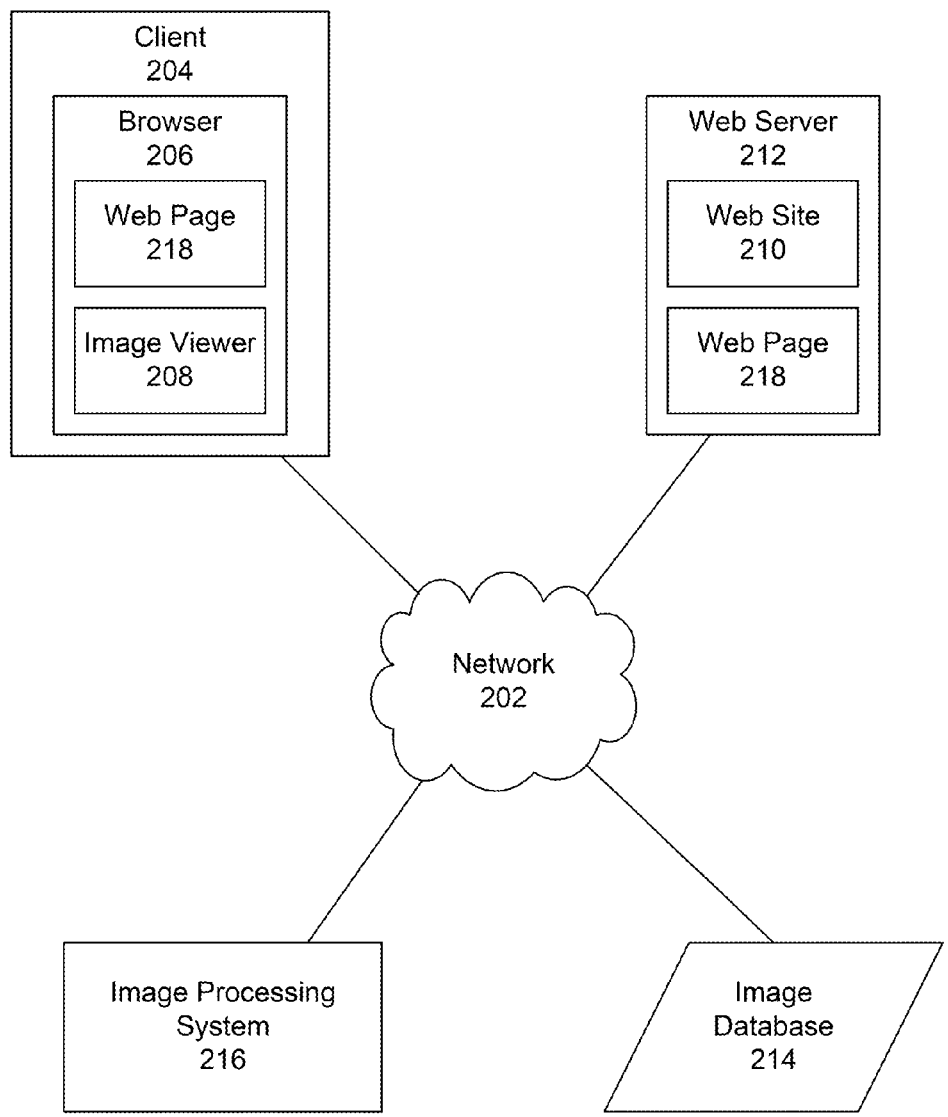
FIG. 2 is a block diagram showing a client/server system in which embodiments of the invention can be implemented.

FIG. 2 is a block diagram of a client/server environment 200 in which embodiments of the present invention, or portions thereof, may be implemented. Client/server environment 200 includes one or more networks 202, web servers 212, and clients 204.

A network 202 may be any network or combination of networks that can carry data communications. Such a network 202 may include, but is not limited to, a local area network, a metropolitan area network, and/or a wide area network, such as the Internet. A network 202 can support technologies including, but not limited to, the World Wide Web ("the web") that provide access to services and applications using protocols such as Hypertext Transfer Protocol (HTTP). Intermediate web servers, gateways, or other servers may be provided between the components of systems shown in FIG. 2, depending on a particular application or environment.

A web server 212 is a computing device, or an application executed on a computing device, that hosts multiple web sites. A web site 210 is one or more resources associated with a domain name and hosted by one or more web servers 212. An example web site is a collection of web pages 218 formatted in Hypertext Markup Language (HTML) that can contain text, images, multimedia content, and programming elements, such as scripts.

A web server 212 delivers resources to a client 204. A resource is any data that can be provided over a network 202. A resource is identified by a resource address that is associated with each resource. Resources include HTML pages, such as a web page 218, word processing documents, and portable document format (PDF) documents, images, video, feed sources, etc. The resources can contain content such as words, phrases, images, and sounds that may include embedded information such as meta information in Hypertext and/or embedded instructions (such as, JavaScript™ scripts).

Client 204 is an electronic device that is under the control of a user and is capable of requesting and receiving resources over a network 202. Examples of client devices 204 include personal computers, mobile communications devices, tablet computers, etc. A client device 204 typically includes an application such as a web browser ("browser") 206. A user can request resources such as web page 218 over network 202 using browser 206. A user requests web page 218 by, for example, typing the website address associated with web page 218 that is stored on web server 212. In response to a request, web server 212 delivers webpage 218 to a client 204. When client 204 receives web page 218 from web server 212, client 204 uses browser 206 to display web page 218 to the user. Browser 206 may also include image viewer program 208. Images may be stored locally on client 204 or may be stored in image database 214 that is accessed by network 202. Client/server environment 200 may also include image processing system 216. Image processing system 216 may exist on client 204, web server 212, or in another network location.

Figure 3:
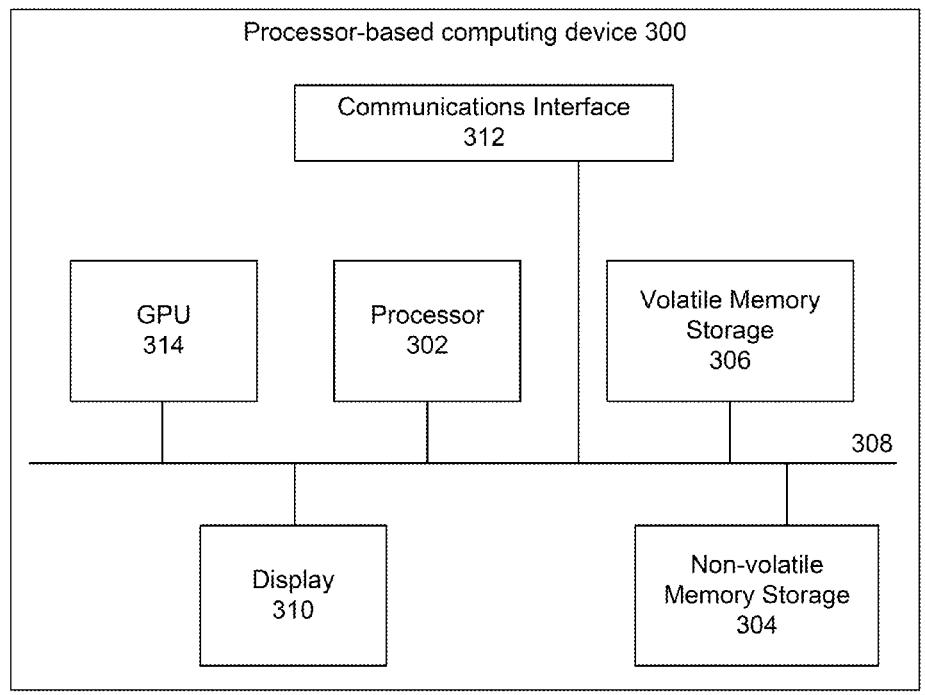
FIG. 3 is a block diagram of a processor-based computing device in which embodiments of the invention can be implemented.

FIG. 3 is an example processor-based computing device 300 in which embodiments of the present invention or portions thereof may be implemented as computer readable code. For example, components or modules of system 200, such as browser 206, image processing system 216, etc., may be implemented in one or more computer systems 300 using hardware, software, firmware, tangible computer readable media having instructions stored thereon, or a combination thereof, and may be implemented on one or more computer systems or other processing systems.

A client 204 and/or web server 212 may include one or more computing devices 300. Client 204, web server 212, and image processing systems 216, may include one or more processors 302, one or more nonvolatile storage media 304, one or more memory devices 306, a communication infrastructure 308, a display device 310, and a communication interface 312. Processors 302 may include any conventional or special purpose processors including, but not limited to, digital signal processors (DSP), field programmable gate arrays (FPGA), and application specific integrated circuits (ASIC).

A GPU (graphics processing unit) 314 is a specialized processor that executes instructions and programs selected for complex graphics and mathematical operations in parallel.

A non-volatile storage device 304 may include one or more of: a hard disk, flash memory, and like devices that may store computer program instructions and data on computer readable media. One or more nonvolatile storage devices 304 may be a removable storage device.

Memory devices 306 may include one or more volatile memory devices such as, but not limited to, random access memory (RAM). Communications infrastructure 308 may include one or more device-interconnect buses such as Ethernet, Peripheral Component Interconnect (PCI) and the like.

Typically, computer instructions are executed using one or more processors 302 and can be stored in non-volatile storage media 304 and memory devices 306.

A display screen 310 allows results of computer operations to be displayed to a user or an application developer.

A communication interface 312 allows software and data to be transferred between a computer system 300 and external devices. A communication interface 312 may include a modem, a network interface (such as an Ethernet card), a communication port, a PCMCIA slot and card or the like. Software and data transferred via communication interface 312 may be in the form of signals which may be electronic, electromagnetic, optical, or other signals capable of being received by communication interface 312. These signals may be provided to communication interface 312 via a communications path. The communication path can carry signals and may be implemented using wire or cable, fiber optics, a phone line, a cellular phone link, an RF link, or other communications channels.

Disclosed embodiments use systems and methods based on machine learning techniques to detect features such as faces and license plates in digital images. Some of the disclosed embodiments can include features related to automatic face detection and identity masking disclosed in commonly owned U.S. Patent Application Publication No. 2009/0262987A1 and features related to object detection with false positive filtering disclosed in commonly owned U.S. patent application Ser. No. 12/453,432. The disclosures of these two applications are incorporated by reference herein in their entirety.

Machine Learning refers to the scientific discipline concerned with the development of algorithms that allow computers to develop "learned" behavior based on empirical data. The data can be from sources such as sensors or databases. Certain algorithms can take example data that exemplifies relations between observed variables and generalize from the data aspects of an assumed but unknown probability distribution. Machine learning algorithms are designed to recognize complex patterns within example data sets. As such they are said to learn from the example data. From the learned patterns, such algorithms are then able to predict output variables corresponding to new, previously unseen input variables.

A class of algorithms called Supervised Learning Algorithms is of interest to embodiments in this disclosure. Supervised learning is the machine learning task of inferring a function from supervised training data. The training data is provided as a set of pairs of input/output variables. An input variable is typically a vector of values and the output is typically a value. Based on the set of input/output variables, the algorithm produces a function called a "classifier" that best characterizes the set of input/output variables. Once the classifier has been determined, it can be used to predict an output value for any valid input variable. It is in this sense that the learning algorithm generalizes from the training data to determine the classifier.

Certain disclosed embodiments may use algorithms known as Support Vector Machines (SVM). One type of SVM takes a set of input data and determines, for each given input, into which of two possible classes the input falls. In this sense, a SVM is a non-probabilistic binary linear classifier. A SVM takes a collection of training data, each element of which is marked as belonging in one of two categories. From this training data, the SVM builds a model or classifier. The classifier is a representation of the example data as points in space. The classifier is constructed so that the categories are separated by a gap that is as large as possible. Using the classifier, new examples are then mapped into one or the other category depending on which side of the gap they fall. As an example of the two categories for an SVM, one might consider license plates and non-license plates. Another example would be the two categories of faces and non-faces.

In the scenario described above, a data point is viewed as a p-dimensional vector and the SVM is designed to find a p-1 dimensional hyperplane that separates the data. In general there are many such hyperplanes. The classifier is one particular hyperplane that separates the data by the largest distance.

Disclosed embodiments are concerned with detecting and classifying objects in images. Image database 114 can include raw images such as unprocessed digital photographic images. The photographic images can include, but are not limited to, portions of panoramic images, such as street-level panoramas. The street-level panoramas may be collected, for example, from a moving vehicle using a custom camera system mounted on the vehicle. The camera system may include a plurality of cameras focused in multiple directions. The cameras may be synchronized to capture images that can be electronically "stitched together" into a panorama. In an example, these images can be high resolution images stitched together to form a panorama having a high resolution. The set of images that can be stitched together into a panorama may be referred to as a panorama set.

As described in detail in commonly owned U.S. Patent Application Publication No. 2009/0262987 A1, and commonly owned U.S. patent application Ser. No. 12/453,432, incorporated herein by reference, the first step in disclosed embodiments is to use an object detector to detect objects in digital images. These objects may be faces or license plates. Disclosed embodiments may use an object detector including a primary high recall sliding window detector and a secondary high precision low sensitivity detector. The object detectors in disclosed embodiments are based on concepts from computer vision.

Object recognition in computer vision is the task of finding a given object in an image or video sequence. Humans are well adapted to recognizing objects in images. Often a human can easily recognize objects even when they are presented with multiple sizes, scales, viewing angles, and even when the objects are partially obstructed from view. Many such object recognition tasks that are easy for humans can be challenging for computer vision systems in general. Existing object detection systems have been augmented in the disclosed embodiments herein by including road or street width data in the feature vectors that are used in the post-processing SVM classifier for increased accuracy.

Figure 4:
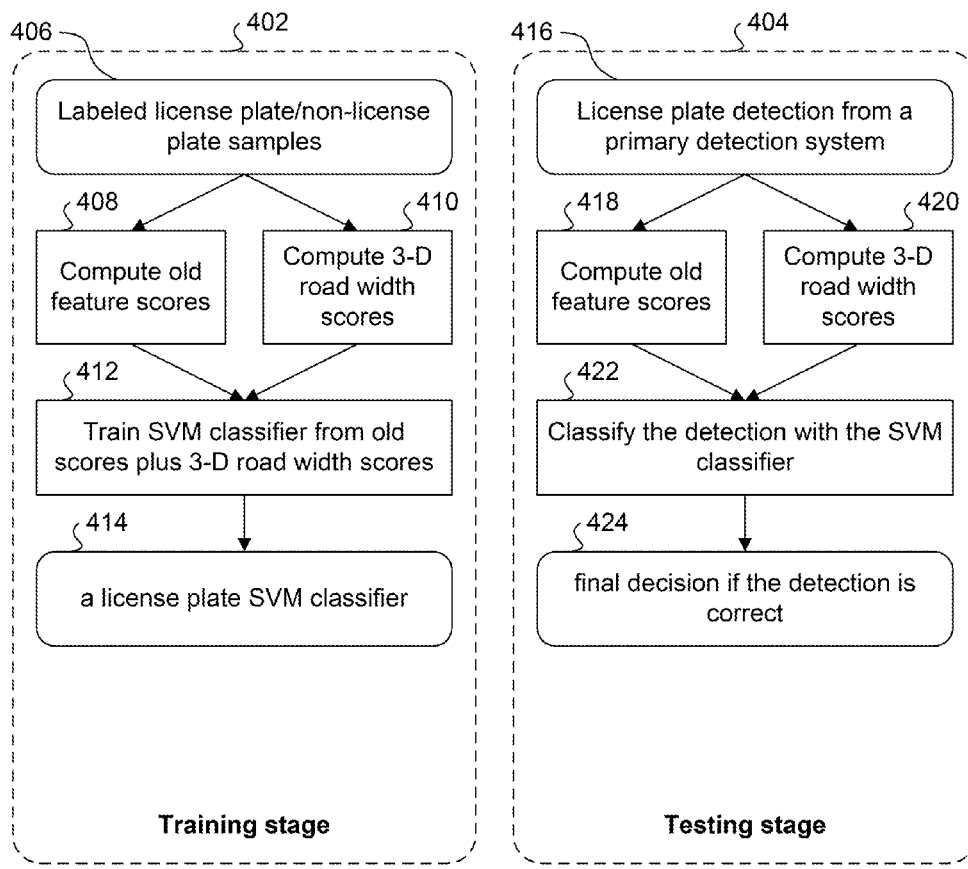
FIG. 4 is a flowchart illustrating an embodiment method of using a machine learning algorithm to generate an object classifier in a training stage and using the object classifier in a testing stage to identify objects in an image.

FIG. 4 illustrates embodiments of the disclosed invention in which computer learning algorithms are used to detect objects, such as faces and license plates, in digital images. There is a training stage 402 and a testing stage 404. In the training stage 402, a classifier 414 is generated as follows. The algorithm takes as input a collection of training data examples 406. The training data in collection 406 includes a digital image or images including a collection of objects that are to be detected. Objects such as license plates or faces, are labeled as such in the training data set. Also included in the training data set is a collection of similar objects that are not of the type of interest. For example, a street sign (e.g., 108, 110, or 112 in FIG. 1) that is rectangular and has similar appearance to a license plate may appear in a digital image. The algorithm must be able to distinguish between such non-objects and the objects of interest.

An object detector is used to determine the location and various attributes of candidate objects in the training data set. One possible attribute returned from an object detector is a detection score 408. The detection score can be a number between 0.0 and 1.0 that indicates the likelihood that the detected object is of the type of interest. A detected object is characterized by a collection of attributes. For example, a detected license plate can be described by a bounding box having Cartesian (x, y) coordinates describing its height, width, and placement within the image. Other information about the detected object could include a camera index, a viewing angle, etc.

The attributes of a detected object can be combined into what is called a "feature vector." Further information in the feature vector can include a ratio of the height to edge width of the box containing the object that is detected. The ratio of the box height to box edge width may capture whether the real world 3-dimensional size of the object indicated in a region is reasonable, given the examples contained in the training set. Embodiments of the present invention also include information regarding the surroundings of the object in question, for example, a description of a road or street 410 (e.g., 114, 116, 118 in FIG. 1) that includes objects of interest. The information determined in step 408 by the object detector can be combined with the road width information 410 to generate a "composite feature vector." In stage 412, the composite feature vector, generated by including information from stages 408 and 410, is fed as input to a machine learning algorithm in stage 412. As discussed previously, the machine learning algorithm that is used can be a Support Vector Machine (SVM) algorithm to generate a license plate or face classifier 414.

Once the classifier 414 is generated by the machine learning algorithm 412, it can be used in the testing stage 404 to detect new objects in previously unseen images. In stage 416, a detector system such as described in U.S. Patent Application Publication No. 2009/0262987 A1, or U.S. patent application Ser. No. 12/453,432 can be used to detect objects in an image, such as faces or license plates. The output of the detector is a collection of detected objects containing various attributes as described earlier. One of these attributes 418 may be a detection confidence score. A composite feature vector is then generated by combining the attributes detected in stage 416 with information regarding the context of the object, such as road width data 420. The composite feature vector generated from the data in stages 418 and 420 is then fed into the machine learning algorithm 422 that uses the classifier determined in stage 414. In stage 422 the classifier takes the set of composite feature vectors as input and, using the classifier determined in stage 414, returns a list of candidate objects that are classified as being of the particular type 424.

The method of identifying objects 404 in a digital image can thus be seen as a two stage process. Object detectors are used in stage 416 to detect a collection of objects. The detector in stage 416 can use a primary detector that has high recall to ensure that it detects all the features that are of interest. By using a high recall detector, however, false positives can also be detected. That is, the collection of objects detected in stage 416 may include objects of interest as well as objects that are not of interest (i.e., false positives). The second stage of this process 422 uses the classifier to determine whether objects returned by stage 416 are objects of interest. The final decision 424 gives confidence that the objects have been properly classified and false positives have been eliminated.

Figure 5:
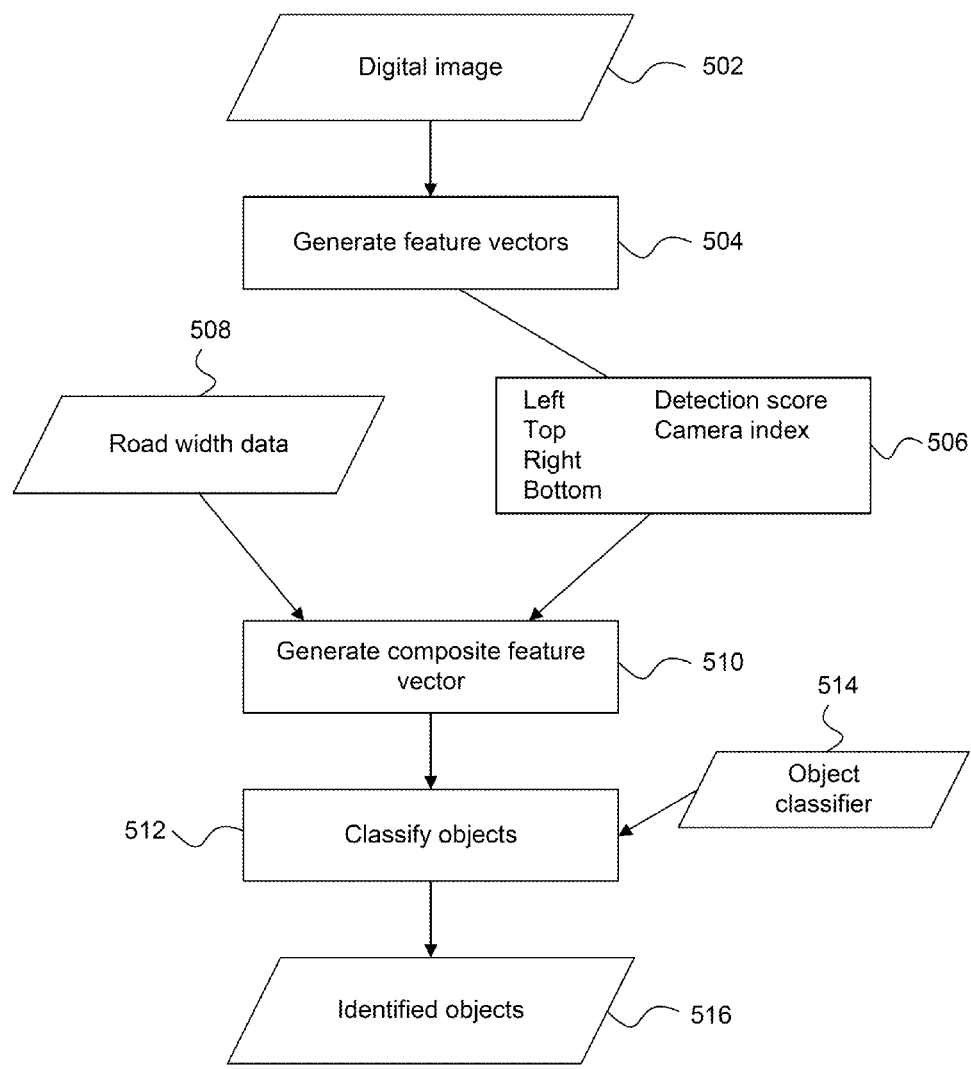
FIG. 5 is a flowchart further illustrating an embodiment method for identifying objects using a machine learning algorithm.

FIG. 5 illustrates, in greater detail, the testing stage that was discussed previously in FIG. 4. The starting point is a digital image 502. An object detection system is used in stage 504 to detect a collection of features. The result is a feature vector 506. For the case of a license plate, for example, the feature vector can contain: a bounding box having top, left, right, and bottom sides, a camera index, possibly a camera angle, a detection score, etc. To improve the detection efficiency, context data such as road width estimates 508 is used in combination with the feature vector 506 to generate a composite feature vector 510. In stage 512, the collection of detected objects, as described by the composite feature vector 510, is classified using a machine learning algorithm that takes as input the object classifier 414 determined in a previous stage 402. The output of the machine learning algorithm in stage 512 is a list of identified objects 516. The use of machine learning algorithm 512 has the effect of eliminating false positives. The two step combined process described in features 402 and 404 of FIGS. 4 and 500 in FIG. 5 is an identifying method in which all objects of interest are identified and false positive are eliminated.

Elements of a feature vector describing license plates have been previously described. For the situation in which the object of interest is a face, the feature vector may include further information, such as information describing an overlap between a region of the object and other regions in an image detected by an object detector. Further information may include a face color probability determined using a histogram model trained using training data including human faces as well as other objects that are not faces. Further information can include an aggregate color statistic including information related to color, hues, saturation, and value within the region. Further information regarding the elements of feature vectors used to detect faces is presented, for example, in U.S. patent application Ser. No. 12/453,432.

Figure 6:
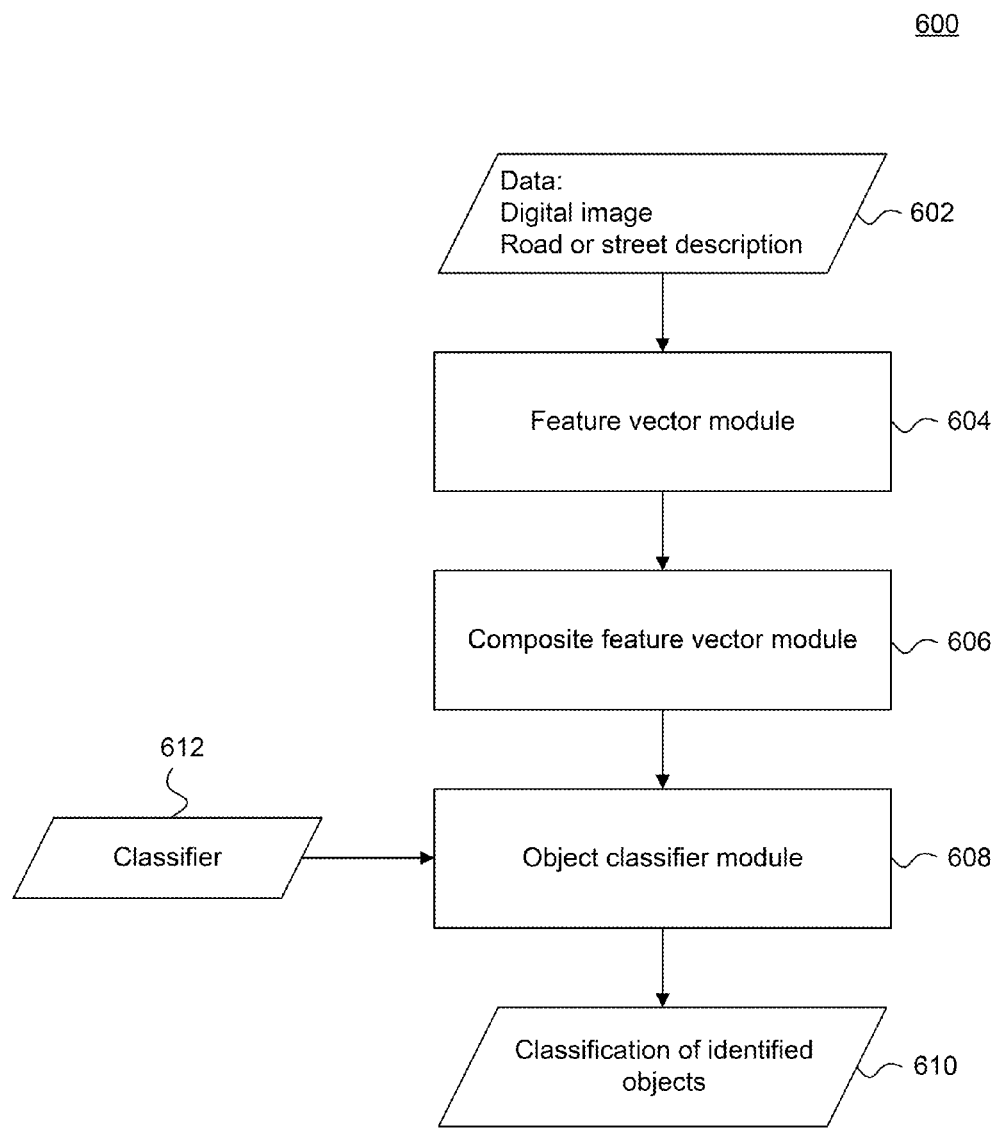
FIG. 6 is an illustration of a computer-implemented system for identifying objects in an image according to an embodiment of the invention.

FIG. 6 illustrates a computer implemented system 600 for identifying objects in a digital image, wherein the objects appear near or in a street or roadway. The input to the system 602 includes a digital image or images containing objects of interest. The objects of interest appear near or in a street or roadway. Thus, the data 602 includes a description of the street or roadway and, in particular, includes estimates of the road width. The system also includes a feature vector module 604 that generates a feature vector for features in the images 602. The feature vector module 604 may include an object detection system. The output of the feature vector module 604 is combined with road width and street data to create a composite feature vector using the composite feature vector module 606. An object classifier module 608 analyzes the composite feature vectors returned from the composite feature vector module 606 along with the previously determined classifier 612. The result of the object classifier module 608 is a classification of identified objects 610.

The collection of classified objects 610 is divided into two categories: objects and non-objects. For example, the primary detection module in feature vector module 604 can return a collection of rectangles, some of which may be license plates. The final result 610 is a classification of detected objects as license plates and non-license plates. Similar statements can be made about the classification of objects that can be classified as faces or non-faces.

Embodiments may also be directed to computer program products comprising software stored on any computer readable medium. Such software when executed in one or more data processing devices causes a data processing device to operate as described herein. Embodiments of the invention can employ any computer useable or readable medium. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, optical storage devices, MEMs, nanotechnological storage devices, etc.).

Typically, computer instructions are executed using one or more processors 202 and can be stored in non-volatile storage medium 304 or memory devices 306. Computer instructions may be stored on a client 204 or web server 212 in a compiled file, an executable file, or a dll library. Computer instructions may also be compiled on a client 204 or web server 204 prior to execution. Computer instructions may also be included in a routine, a subroutine, or layers of a software stack that are manipulated by processors 202.

Embodiments have been described above with the aid of functional building blocks illustrating the implementation of specific functions and relationships thereof. The boundaries of these functional building blocks have been arbitrarily defined herein for the convenience of the description. Alternate boundaries can be defined so long as the specific functions and relationships thereof are appropriately performed.

The foregoing description of the specific embodiments will so fully reveal the general nature of embodiments that others can, by applying knowledge within the skill of the art, readily modify and/or adapt for various applications, such specific embodiments without undue experimentation, without departing from the general concept of the present invention.

Therefore, such adaptations and modifications are intended to be within the meaning and range of equivalence of the disclosed embodiments based on the teachings and guidance presented herein. It is to be understood that the phraseology or terminology herein is for the purpose of description and not of limitation, such that the terminology or phraseology of the present specification is to be interpreted by the skilled artisan in light of the teaching and guidance presented herein.

The Summary and Abstract sections may set forth one or more but not all exemplary embodiments of the present invention as contemplated by the inventor and thus are not intended to limit the present invention and appended claims in any way.

The breadth and scope of the present invention should not be limited by any of the above described exemplary embodiments, but rather, should be defined only in accordance with the following claims and their equivalents.

What is claimed is:

1. A computer-implemented method for generating a classifier for detecting objects in a digital image, the method comprising:
   providing, for each object in a set of objects in one or more digital images, a description of a roadway or a street in which or near which each object appears, the description including a corresponding road or street width estimate;
   generating, by one or more processors, a set of composite feature vectors by combining one or more selected feature vectors with the corresponding roadway or street description including the width estimate, each composite feature vector including attributes of a given one of the set of objects; and
   generating, by the one or more processors, an object classifier that filters out false positives using the composite feature vectors.

2. The method of claim 1, wherein each selected feature vector includes a detection score indicating a likelihood that a given object in the set of objects is of a predetermined type of interest.

3. The method of claim 2, wherein the predetermined type of interest is either a license plate type or a face type.

4. The method of claim 1, wherein the generating the object classifier comprises using a Support Vector Machine (SVD) algorithm to generate the object classifier.

5. The method of claim 1, wherein the width estimate represents an effective road or street width associated with a given object.

6. The method of claim 5, wherein the effective road or street width varies with position of the given object in each image.

7. The method of claim 1, wherein the width estimate is a three-dimensional width estimate.

8. A computer-implemented method for identifying objects in a digital image, wherein the objects appear near or in a street or roadway, the method comprising:
   generating, by one or more processors, a set of feature vectors using an object detector to generate a feature vector for each candidate object in a set of candidate objects, each candidate object having a description of a roadway or street in which or near which the candidate object appears, the description including a corresponding roadway or street width estimate;
   generating, by the one or more processors, a set of composite feature vectors by combining each generated feature vector with the corresponding roadway or street description; and
   identifying, by the one or more processors, objects of a particular type.

9. The method of claim 8, wherein each generated feature vector includes a detection score indicating a likelihood that a given object in the set of objects is of a predetermined type of interest.

10. The method of claim 9, wherein the predetermined type of interest is either a license plate type or a face type.

11. The method of claim 8, wherein the width estimate represents an effective road or street width associated with a given object.

12. The method of claim 11, wherein the effective road or street width varies with position of the given object in each image.

13. The method of claim 8, wherein the width estimate is a three-dimensional width estimate.

14. A computer-implemented system for generating a classifier for detecting objects in a digital image, the system comprising:
   a feature vector module configured to generate a set of feature vectors for each object in a set of objects, each object having a description of a roadway or street in which or near which the object appears, the description including a corresponding roadway or street width estimate;
   a composite feature vector module configured to generate a set of composite feature vectors by combining each generated feature vector with the corresponding road or street description; and
   an object classifier module configured to generate an object classifier used to identify objects of a particular type.

15. The system of claim 14, wherein the feature vector module is further configured to detect one or both of license plates or faces.

16. The system of claim 14, wherein each generated feature vector includes a detection score indicating a likelihood that a given object in the set of objects is of a predetermined type of interest.

17. The system of claim 16, wherein the predetermined type of interest is either a license plate type or a face type.

18. The system of claim 14, wherein the width estimate represents an effective road or street width associated with a given object.

19. The system of claim 18, wherein the effective road or street width varies with position of the given object in each image.

20. The system of claim 14, wherein the width estimate is a three-dimensional width estimate.

* * * * *